US009506579B2

(12) United States Patent
Borsic

(10) Patent No.: US 9,506,579 B2
(45) Date of Patent: Nov. 29, 2016

(54) HEIGHT ADJUSTABLE DRAIN FITTING FOR A TOILET FLUSH TANK

(71) Applicant: Silvo Borsic, Ruse (SI)

(72) Inventor: Silvo Borsic, Ruse (SI)

(73) Assignee: GEBERIT INTERNATIONAL AG, Jona (CH)

( * ) Notice: Subject to any disclaimer, the term of this patent is extended or adjusted under 35 U.S.C. 154(b) by 65 days.

(21) Appl. No.: 13/959,180

(22) Filed: Aug. 5, 2013

(65) Prior Publication Data

US 2014/0034150 A1    Feb. 6, 2014

(30) Foreign Application Priority Data

Aug. 3, 2012    (EP) .................................... 12179211

(51) Int. Cl.
| | | |
|---|---|---|
| *F16K 51/00* | (2006.01) | |
| *E03D 1/14* | (2006.01) | |
| *E03D 1/30* | (2006.01) | |

(52) U.S. Cl.
CPC ................. *F16K 51/00* (2013.01); *E03D 1/14* (2013.01); *E03D 1/30* (2013.01); *Y10T 137/6851* (2015.04)

(58) Field of Classification Search
CPC ............ E03D 1/14; E03D 1/142; E03D 1/30
USPC ........... 4/324, 325, 415, 410, 358, 378, 390, 4/391, 397–400
See application file for complete search history.

(56) References Cited

U.S. PATENT DOCUMENTS

| | | | | |
|---|---|---|---|---|
| 4,566,140 A | * | 1/1986 | Musgrove .......................... | 4/324 |
| 4,956,880 A | * | 9/1990 | Bailet ................................ | 4/413 |
| 5,265,282 A | * | 11/1993 | Schmucki ......................... | 4/325 |
| 5,265,283 A | * | 11/1993 | Pourcier ............................ | 4/410 |
| 5,305,474 A | * | 4/1994 | Nardi et al. ...................... | 4/324 |
| 6,081,938 A | * | 7/2000 | McClure et al. ................. | 4/325 |
| 6,163,897 A | * | 12/2000 | Plas et al. ......................... | 4/410 |
| 6,637,041 B1 | * | 10/2003 | Gutierrez et al. ................ | 4/325 |
| 6,785,913 B2 | * | 9/2004 | Ho .................................... | 4/325 |
| 8,056,154 B2 | * | 11/2011 | Martin .............................. | 4/325 |
| 8,104,104 B2 | * | 1/2012 | Le et al. ........................... | 4/410 |

(Continued)

FOREIGN PATENT DOCUMENTS

| | | |
|---|---|---|
| CN | 1406304 A | 3/2003 |
| CN | 1472407 A | 2/2004 |

(Continued)

OTHER PUBLICATIONS

Machine Translation for CN201321650.*

(Continued)

*Primary Examiner* — Erin Deery
(74) *Attorney, Agent, or Firm* — Sughrue Mion, PLLC

(57) ABSTRACT

A height-adjustable drain fitting for a flushing tank comprises a drain valve housing, a valve body that can be lifted along an actuating axis so as to initiate flushing, an actuating unit that acts on the valve body and controls the movement of the valve body, an actuating member which acts on the actuating unit, an actuating element that acts on the actuating member and by element of which the actuating member can be actuated by the user, and a mounting element having a receptacle for mounting the actuating member. The mounting element is displaceable relative to the drain valve housing and is connected thereto for adjusting the height. The actuating member has the shape of an actuating rod and is designed so as to be height-adjustable.

37 Claims, 5 Drawing Sheets

(56) References Cited

U.S. PATENT DOCUMENTS

| | | |
|---|---|---|
| 2003/0131403 A1 | 7/2003 | Ho et al. |
| 2004/0083542 A1* | 5/2004 | Oury .............................. 4/325 |
| 2009/0025129 A1 | 1/2009 | Le et al. |

FOREIGN PATENT DOCUMENTS

| | | |
|---|---|---|
| CN | 1898449 A | 1/2007 |
| CN | 1981096 A | 6/2007 |
| CN | 200952595 Y | 9/2007 |
| CN | 201106202 Y | 8/2008 |
| CN | 201321650 Y | 10/2009 |
| DE | 29906646 U1 | 9/1999 |
| EP | 1 287 210 A1 | 3/2003 |
| EP | 1 428 945 A2 | 6/2004 |
| EP | 1703029 A1 | 9/2006 |
| WO | 00/15914 A1 | 3/2000 |
| WO | 2006/000475 A1 | 1/2006 |
| WO | 2011/086452 A1 | 7/2011 |

OTHER PUBLICATIONS

European Search Report and Written Opinion of EP 12 17 9211 dated Nov. 27, 2012.

* cited by examiner

HEIGHT ADJUSTABLE DRAIN FITTING FOR A TOILET FLUSH TANK

TECHNICAL FIELD

The present invention relates to a height-adjustable drain fitting for a flushing tank according to the preamble of claim 1.

PRIOR ART

From EP 1 287 210, a drain fitting for a flushing tank has become known. With this drain fitting, very good results have been achieved in practice. In particular, the adjustment of the height between actuating button and flushing valve has proved to be particularly advantageous. However, the drain fitting exhibits a complex mechanical construction which makes the production thereof cost-intensive. Due to the design of the drain fitting, the latter requires more space, which is negative for certain applications.

A similar drain fitting has also become known from WO 2011/086452. The space required in the flushing tank for this drain fitting has been slightly reduced with respect to the drain fitting known from EP 1 287 210. However, this drain fitting has the disadvantage that the flushing valve is actuated through a complex bracket mechanism which, on the one hand, is susceptible to malfunctions and, on the other, increases the dimensions of the fitting again.

SUMMARY OF THE INVENTION

Based on this prior art it is an object of the invention to provide a height-adjustable drain fitting which overcomes the disadvantages of the prior art. In particular, the height-adjustable drain fitting shall be designed comparatively compact with regard to the outer dimensions.

This object is achieved by a height-adjustable drain fitting according to claim 1. Accordingly, the height-adjustable drain fitting for a flushing tank comprises a drain valve housing having an interior, a valve body that is mounted in the interior and can be lifted along an actuating axis so as to initiate flushing, an actuating unit that acts on the valve body and controls the movement of the valve body and that is arranged at least partially or completely in the interior, an actuating member which acts on the actuating unit for initiating flushing, an actuating element by means of which the actuating member can be actuated by the user, and a mounting element having a receptacle for mounting the actuating member. For adjusting the height, the mounting element is displaceable relative to the drain valve housing and connected thereto, and the receptacle is spaced apart from the drain valve housing. The actuating member has the shape of an actuating rod which extends out of the interior of the drain valve in the direction of the actuating axis and is designed so as to be adjustable in terms of the height.

The spaced receptacle for mounting the actuating member has the advantage that the actuating member is mounted within the flushing tank between the actuating element and the actuating unit, whereby the functional reliability of the drain fitting is ensured. Furthermore, by forming the actuating member as a rod which extends out of the interior of the drain valve, a particularly compact drain fitting can be provided.

Preferably, the actuating rod is collinear to the actuating axis, whereby a particularly secure actuation of the actuating unit is achieved.

The actuating rod is mounted in the receptacle of the mounting element and, advantageously, the mounting element also mounts the actuating element.

In a refinement of the invention, the drain fitting comprises a locking element which is mounted on the drain valve housing and by means of which the mounting element can be locked on the drain valve housing, wherein locking is carried out in particular through a latching connection between the locking element and the mounting element.

Preferably, the actuating rod is fed through the locking element, wherein the actuating rod is designed to be movable relative to the locking element in the direction of the actuating axis, and wherein the actuating rod is designed to be rotationally fixed with respect to the locking element. Through this, optimal mounting of the actuating rod can be achieved. Moreover, pivoting the actuating rod also allows establishing a connection of the actuating rod to other elements such as, for example, to the actuating unit, as explained below.

The locking element can be brought into a locking position in which the mounting element is fixed with respect to the drain valve housing, and into a release position in which the mounting element can be moved with respect to the drain valve housing, wherein the height adjustment between the drain valve housing and the mounting element is made possible in the release position.

Preferably, in said locking position, the actuating rod is in engagement with the actuating unit and in said release position, the engagement between the actuating rod and the actuating unit is released so that the height adjustment of the actuating rod and the mounting element is enabled. For this, the actuating rod is displaced relative to the actuating unit.

It is particularly advantageous here if the actuating rod is mounted in the receptacle in such a manner that by displacing the mounting element, the receptacle is also displaced.

Particularly preferred, the actuating rod is designed to be pivotable about the actuating axis and can be brought into engagement with the actuating unit via said pivoting movement.

Preferably, the mounting element comprises latching means, in particular a tooth system, and the locking element likewise has a latching means, wherein the mounting element can be locked or latched with respect to the locking element via said latching means. In the locking position, the latching means of the mounting element and the locking element are in mutual engagement.

Preferably, the actuating rod comprises latching means extending along the actuating rod, in particular a tooth system, which engages with the actuating unit so that a movement of the actuating rod can be transmitted to the actuating unit.

Preferably, the actuating unit comprises a plate having an opening for receiving the actuating rod, wherein said plate is located between two adjacent latching means of the actuating rod and in this manner, the movement can be transmitted from the actuating rod to the plate. Thus, when pivoting from the release position into the locking position, the actuating rod is rotated relative to the plate, whereby parts of the plate are being positioned between adjacent latching means.

Preferably, the actuating rod is fed through the locking element through an opening in the locking element, wherein the opening has at least one recess for the latching means, wherein the rotationally fixed connection can be provided by the latching means protruding into said recess.

Preferably, the actuating element has two buttons for initiating a dual flush, wherein the dual flush is particularly preferably controlled via the different stroke of the buttons and the corresponding different activation and/or function of the actuating unit.

Preferably, when viewed in the direction of the actuating axis and, the mounting element has a cross-section with regard to its outer dimension, which cross-section is substantially the same as or smaller than the outer dimension of the drain valve housing when viewed in the direction of the actuating axis.

The mounting element comprises a yoke section in which the receptacle is arranged, and comprises at least two mounting rods extending from the yoke section, wherein the mounting rods are mounted in guides on the drain valve housing.

Further embodiments are specified in the dependent claims.

BRIEF DESCRIPTION OF THE DRAWINGS

Preferred embodiments of the invention are described below by means of the drawings which merely serve for illustration and are not to be interpreted as limiting.

DESCRIPTION OF PREFERRED EMBODIMENTS

Figure 1:
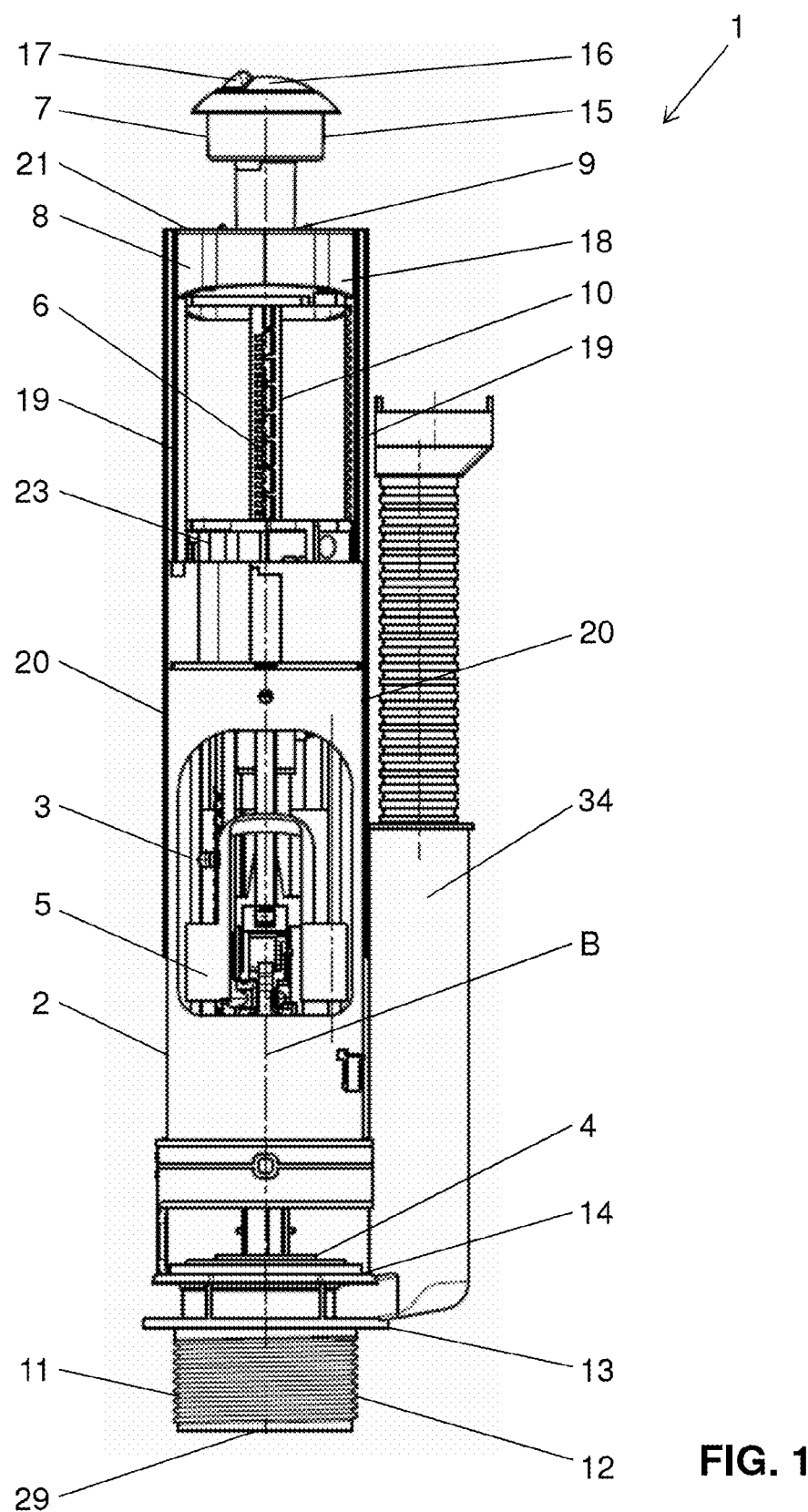
FIG. 1 shows a side view of a drain fitting according to an embodiment of the present invention.

FIG. 1 shows a height-adjustable drain fitting 1 for a flushing tank in a side view.

The drain fitting 1 shown comprises a drain valve housing 2 with an interior 3, a valve body 4 that is mounted in the interior 3 and can be lifted along an actuating axis B for initiating flushing, an actuating unit 5 that acts on the valve body 4 and controls the movement of the valve body 4, an actuating member 6 that acts on the actuating unit 5 so as to initiate flushing, an actuating element 7 by means of which the actuating member 6 can be actuated by the user, and a mounting 8 having a receptacle 9 for mounting the actuating member 6. During an actuation of the drain fitting, the user actuates the actuating element 7 which acts on the actuating member 6. The latter then acts on the actuating unit 5 which then moves the valve body 4 from a closed position into a flushing position and keeps it open. After draining the provided amount of flushing water, the actuating unit 5 brings the valve body 4 from the flushing position into the closed position again.

The mounting element 8 including the receptacle 9 is arranged spaced apart from the drain valve housing 2 so that the actuating member 6 is securely mounted, and the movement thereof is well guided. The actuating member 6 can be moved relative to the receptacle 9 in the direction of the actuating axis B.

In the lower region, the drain valve housing 2 has a connecting nozzle 11 with a continuous outlet opening 29. Via the connecting nozzle 11, the drain fitting 1 can be connected to the outlet opening of a flushing tank that is not illustrated here. For this, the connecting nozzle 11 in the present embodiment has a thread 12 to which a flange 13 is connected. The thread 12 is clamped against the outside of the flushing tank by means of a threaded nut that is not shown here. In this case, the flange 13 is on the inside of the flushing tank.

Furthermore, the drain fitting 1 includes here a valve seat 14 on which the valve body 4 is seated. During the flushing process, the valve body 4 can be lifted off the valve seat 14 so that the flushing water can be removed from the flushing tank via the outlet opening 29 in the connecting nozzle 11. Starting from the valve seat 14, the valve body 4 can be moved from a closed position into a flushing position and back again by means of the actuating unit 5.

The present drain fitting 1 is designed here to be height-adjustable so that the drain fitting 1 can be used in different flushing tanks. Preferably, the drain fitting 1 is used in flushing tanks made from ceramics.

In particular such flushing tanks usually have wide tolerances, which is why height adjustment is extremely advantageous. Height adjustment means here that the height of the drain fitting 1 can be changed. In particular, the distance between the actuating element 7 and the flange 13 or the valve body 4 is suitably adjusted. Therefore, the present drain fitting 1 can be used universally.

In the embodiment shown in FIG. 1, there are substantially two elements that are height-adjustable with regard to the drain valve housing 2. On the one hand, the mounting element 8 can be displaced in the movement axis B relative to the drain valve housing 2. Thus, the distance between the mounting element 8 and the drain valve housing 2 is adjusted so that as a result, the total height of the drain fitting 1 is also changed accordingly. On the other hand, the height of the actuating member 6 is also changed or can be adjusted. By changing the actuating member 6 it is ensured that the actuation of the actuating element 7 is transferred to the actuating unit 5.

In the present embodiment, the actuating member 6 has the shape of an actuating rod 10. The actuating rod 10 extends from the interior 3 of the drain valve housing 2 out of the drain valve housing 2, resulting in a particularly compact drain fitting 1. Moreover, due to the mounting of the actuating rod 10 within the drain fitting 1, the latter is less susceptible to defects which, for example, can be caused by maintenance work in the interior of the flushing tank.

Particularly preferred, as shown in the Figures, the actuating rod 10 is collinear to the actuating axis B and, as already explained above, is designed to be height-adjustable with regard to the drain valve housing 2 and/or the actuating unit 5 mounted therein. The arrangement of the actuating rod 10 collinear to the actuating axis B has the advantage that not only an extremely compact drain fitting 1 can be provided, but, in addition, a reliable actuation of the actuating unit is ensured.

In other words, it can also be said that the actuating rod is arranged within a virtual cylinder which is defined by the outer wall of the drain valve housing 2. Accordingly, outside of this virtual cylinder, there are no parts for actuating the drain fitting 1 that would increase the outer dimensions.

FIG. 1 also shows parts of an exemplary actuating unit 5. The actuating unit 5 acts on the valve body 4 and controls the valve body's 4 movement from the closed position into the flushing position and back. Such actuating units 5 are known from the prior art. In the present embodiment, preferably, an actuating unit 5 is used which redirects a movement of the actuating member 6 toward the valve body 4 in an opposite direction. The actuating unit 5 further comprises floats and/or weight elements which, upon reaching a predetermined filling level in the flushing tank, move the valve body 4 from the flushing position back into the closed position on the valve seat 14.

Figure 2:
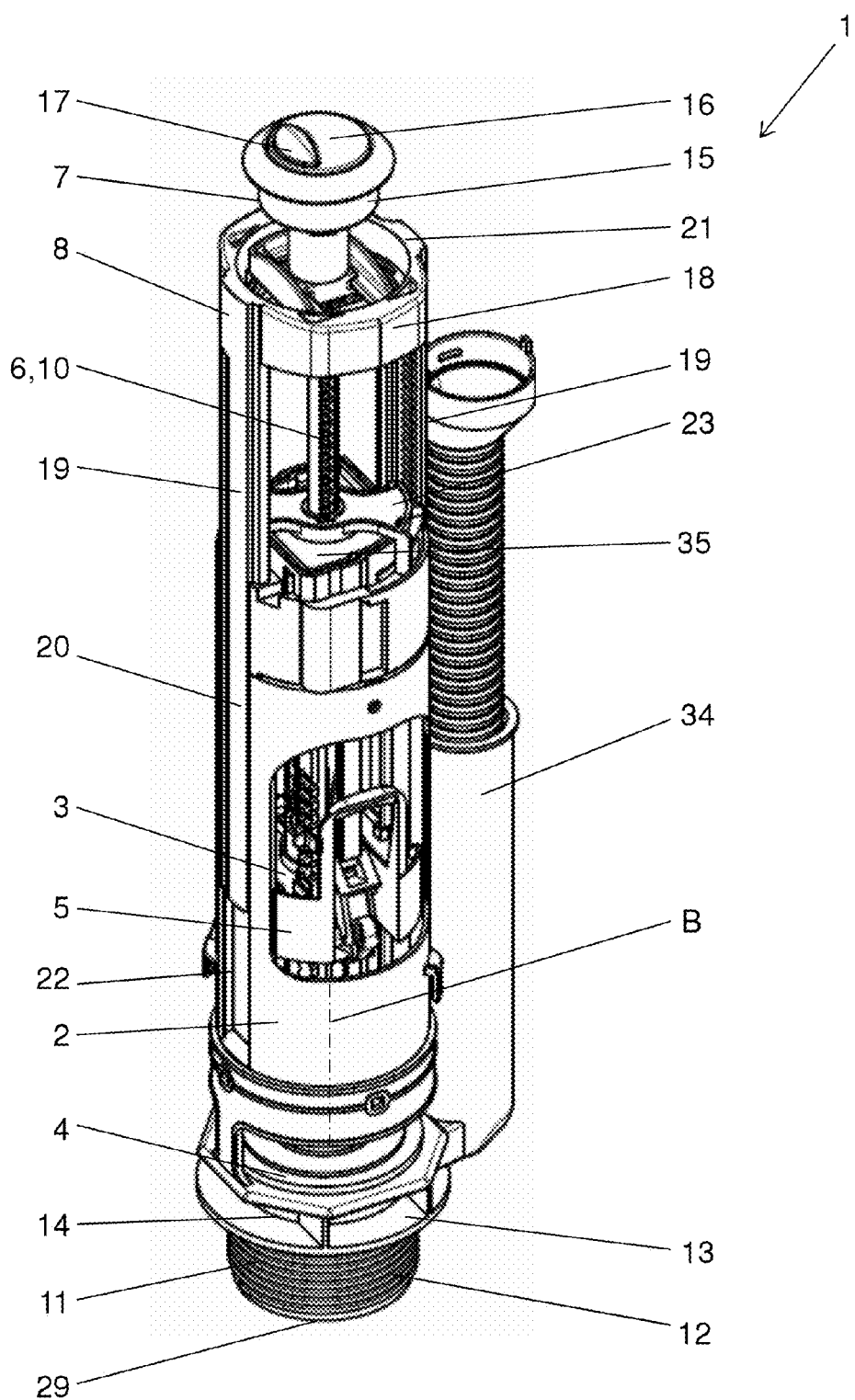
FIG. 2 shows a perspective view of the drain fitting according to FIG. 1.

The actuating rod 10 is connected here to a plate 35 that is associated with the actuating unit 5. This is shown in FIG. 2. Through this plate 35, the movement of the actuating rod 10 is brought to the actuating unit 5.

In the present embodiment, the actuating element 7 has two actuating buttons 16, 17. The large actuating button 16 serves for initiating a full flush, while the small actuating button 17 serves for initiating a partial flush. Preferably, the actuating unit 5 is designed to be height-controlled. During the actuation of the large actuating button 16, the actuating member 6 covers a different distance than during the actuation of the small actuating button 17, by which means the actuating unit 5 is activated differently. In this way, the actuating unit 5 keeps the valve body 4 in the flushing position for differently long time periods, thereby enabling the partial flush and the full flush. Typically, for this purpose, floats and/or weights are connected or bridged in different heights of the actuating unit 5.

The actuating element 7 further comprises a surface shell 15 by means of which the actuating element 7 can be mounted in the cover of a flushing tank.

Preferably, when viewed in the direction of the actuating axis B, the mounting element 8 has a cross-section with regard to its outer dimension, which cross-section is substantially the same as or smaller than the outer dimension of the drain valve housing 2 when viewed in the direction of the actuating axis. This makes it possible to create a particularly compact structure.

In the present embodiment, the mounting element 8 comprises a yoke section 18 that lies substantially perpendicular to the actuating axis B. The mounting element 8 further comprises two mounting rods 19 extending from the yoke section 18. The mounting rods 19 run parallel to the actuating axis B. The mounting rods 19 are mounted in guides 20 on the drain valve housing 2. Moreover, said receptacle 9 for guiding the actuating member 6 and/or the actuating rod 10 is arranged in the yoke section 18.

Moreover, the yoke section 18 has an upper surface 21 here on which the lower side of a flushing tank cover can be mounted or supported. Through this support, the drain fitting 1 is secured in the flushing tank.

Figure 3:
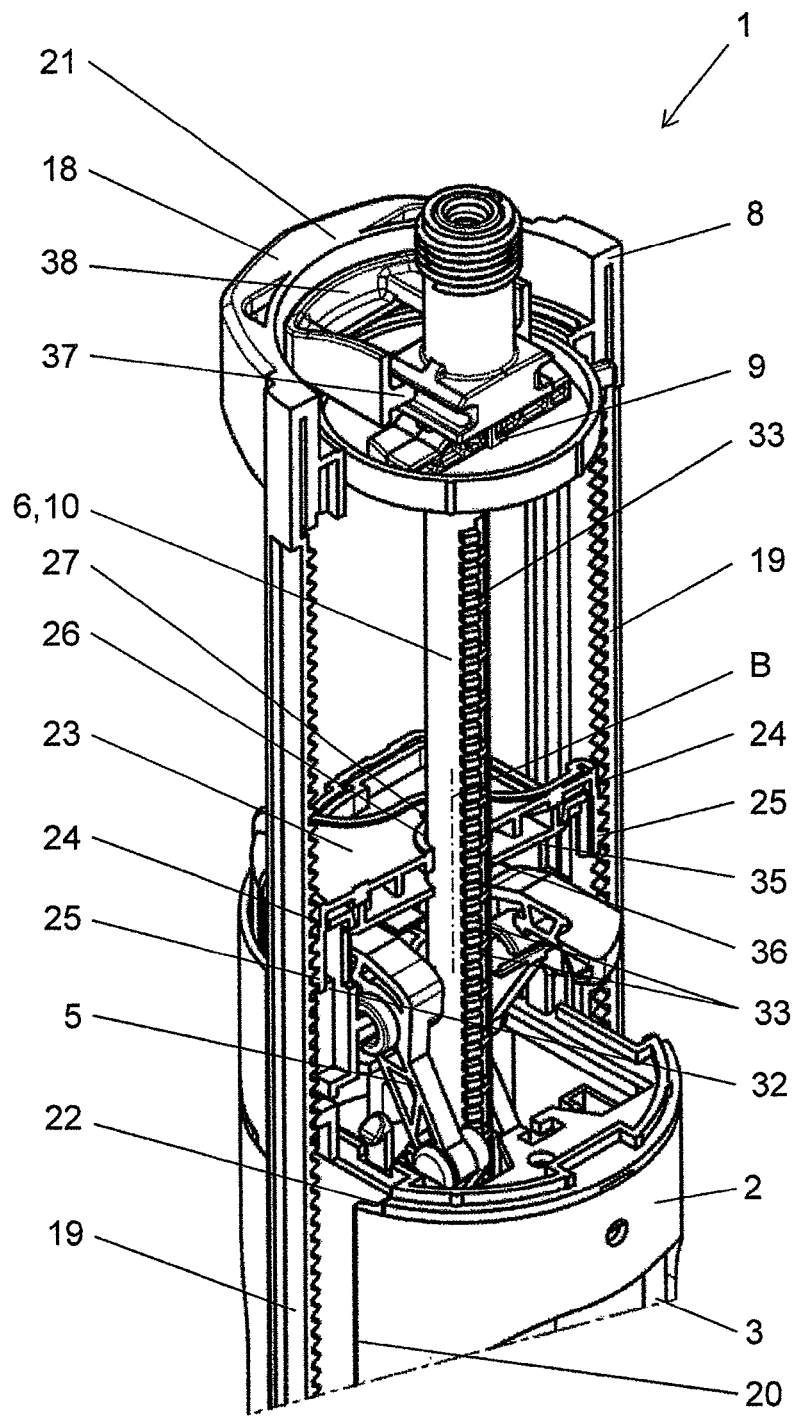
FIG. 3 shows a detailed view of the drain fitting according to FIG. 1 with parts that are partially cut open.

The FIGS. 2 and 3 clearly show that the guides 20 on the drain valve housing 2 have the shape of a T-groove 22. The mounting rods 19 are formed complementary to or suitable for this T-groove 22. When adjusting the height, the mounting rods 19 are displaced relative to the drain valve housing 2 in the T-groove. When reducing the height, the mounting rods 19 are pushed into the T-groove 22, and when increasing the height, the mounting rods 19 are pulled out of the T-groove 22.

Furthermore, FIG. 2 clearly shows that the drain fitting 1 comprises a locking element 23 that is mounted on the drain valve housing 2. With regard to a movement in the direction of the actuating axis B, the locking element 23 is fixed on the drain valve housing 2. The locking element 23 serves for providing an interlock between the mounting element 8 and the drain valve housing 2. Here, the latching connection is provided via latching elements 24, 24 between the mounting rods 19 and the locking element 23.

The actuating rod 10 is preferably fed through the locking element 23 in such a manner that the actuating rod 10 is movable with respect to the locking element 23 in the direction of the actuating axis B, and that the actuating rod 10 is rotationally fixed with respect to the locking element 23. Accordingly, a movement between the locking element 23 and the actuating rod 10 in the direction of the actuating axis B is permitted, whereas a rotation about the actuating axis B is prevented. The movement of the actuating rod 10 relative to the locking element 23, which is stationary with regard to the drain valve housing 2, has the advantage that the height of the actuating rod 10 is changeable in a simple manner. Moreover, the locking element also acts as a guide for the rod 10.

Figure 5:
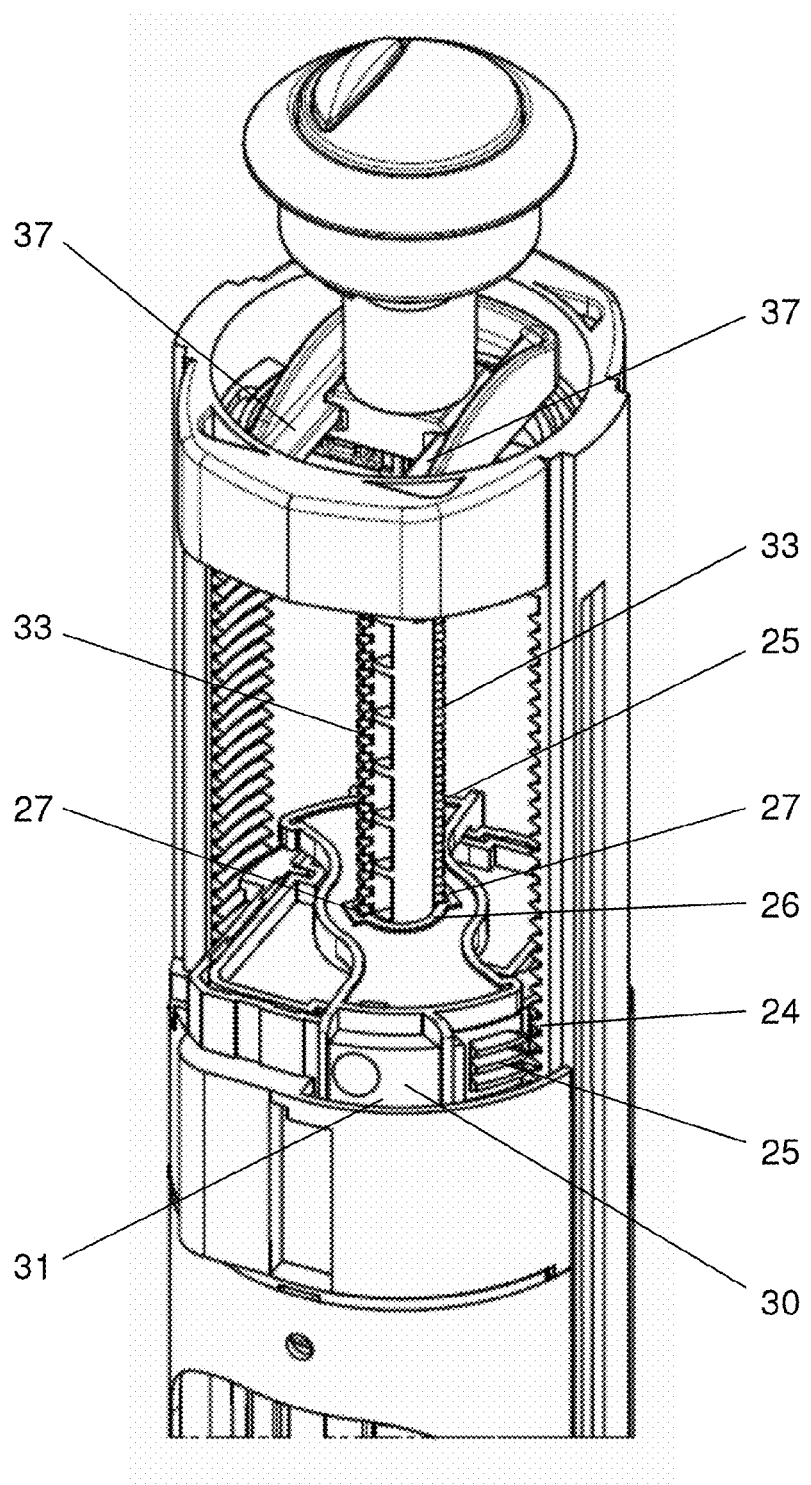
FIG. 5 shows a perspective detailed view of FIG. 2 in the released state.

FIG. 3 shows the locking element in a partially cut illustration. It is clearly visible here that the locking element 23 can be moved into a locking position that fixes the mounting element 8 with respect to the drain valve housing 2. In the locking position, the mounting element 8 is fixed with respect to the drain valve housing 2 and no relative movement between the two elements is permitted. Via a pivoting movement about the actuating axis B, the locking element 23 can be brought from a locking position into a release position. This release position is shown in FIG. 5. In this release position, a movement between the mounting element 8 and the drain fitting housing 2 is enabled so that the height adjustment between the drain valve housing 2 and the mounting element 8 is permitted. After completed height adjustment, the locking element 23 is moved back into the locking position by the plumber.

In said locking position, the actuating rod 10 is in engagement with the actuating unit 5. Accordingly, transmission of movement from the actuating element 7 to the actuating unit 5 via the actuating member 6 or the actuating rod 10 is possible in the locking position. In the release position, the engagement between the actuating rod 10 and the actuating unit 5 is released so that the height adjustment of the actuating rod 10 is made possible. Through this, the actuating rod 10 is displaced relative to the actuating unit 5 which, with regard to the height, is arranged substantially stationarily within the drain valve housing 2.

This has the advantage that through a single actuation of the locking element 23, the interlock between the actuating unit 5 and the actuating rod 10 and also the engagement of the mounting element 8 and the drain valve housing 2 can be established or released. Hereby, the height adjustment can be carried out in an extremely simple manner.

Preferably, at least one of the mounting rods 19 comprises a plurality of latching means, in particular a tooth system 24. The locking element 23 likewise comprises latching means 25. Through these latching means 24, the mounting element 8 can be latched with the locking element 23 and therefore also with the drain valve housing 2. This latching is clearly visible in the FIGS. 3 and 5. A plurality of teeth of the latching means 25 of the locking element 23 engage with a plurality of teeth of the latching means 24 of the mounting rods 19.

Figure 4:
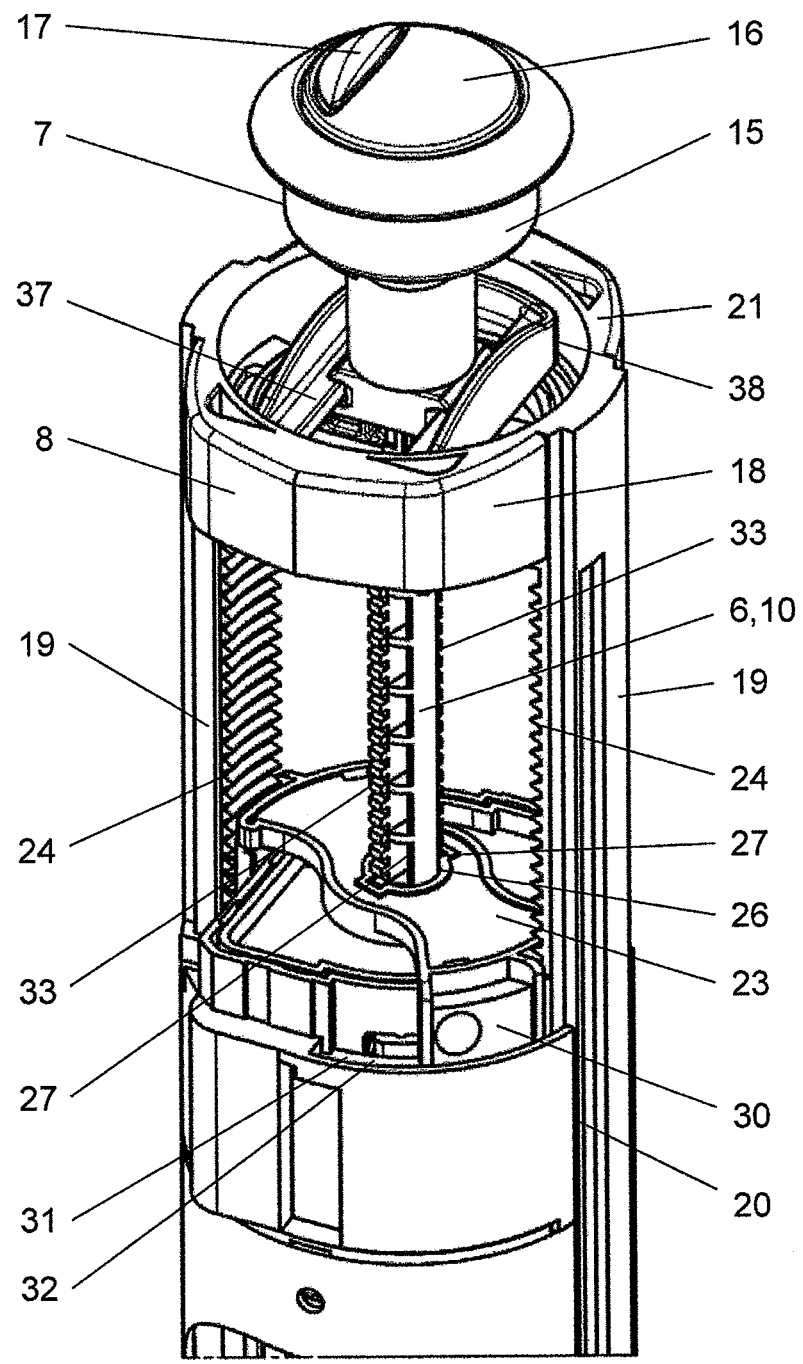
FIG. 4 shows a perspective detailed view of FIG. 2 in the latched state.

Furthermore, it is apparent from the FIGS. 4 and 5 that the locking element 23 is designed to be pivotable with respect to the stationary drain valve housing 2. Two lugs formed on the locking element 23 protrude into guides 31. Via these lugs 30, the locking element 23 also rests on a surface 32 on the drain valve housing 2. Through said surface 32, a force acting in the direction of the actuating axis on the mounting element can be transmitted onto the drain valve housing. Such a force acts, for example, from the cover of the flushing tank.

When the latching means 25 of the locking element 23 are not in engagement with the latching means 24 of the mounting rods 19, the locking element 23 is in the release position. The engagement between the two latching means thus is released and the mounting rod 19 can be displaced relative to the drain valve housing 2. Furthermore, in the release position as shown in FIG. 5, the actuating member 6 or the actuating rod 10 is also pivoted about the actuating axis. Here, the engagement between the actuating rod 10 and the actuating unit 5 is released in accordance with the above description, and the actuating rod 10 together with the mounting element 8 can be displaced accordingly with respect to the drain valve housing 2 for the purpose of adjusting the height.

As shown in the FIGS. 3 to 5, the actuating rod 10 has latching means 33 extending along the actuating rod 10 and/or the actuating axis B. The latching means 33 have in particular the shape of a tooth system that is arranged on both sides and opposite to one another with regard to the actuating axis B and extend away from the surface of the actuating rod 10. Through this tooth system, the actuating rod 10 is connected to a plate 35 of the actuating unit 5. The plate 35 comprises an opening 36 through which the actuating rod 10 is fed through the plate 35. Recesses, which are not shown here, extend from the opening 36. By pivoting the actuating rod 10 relative to the fixed plate 35, the tooth system is positioned in the region of the recess so that a movement between the plate 35 and the rod 10 is allowed. Moreover, in the locking position, the plate 35 protrudes between two adjacent latching means 33 so that the rod 10 is connected to the plate 35.

These latching means 33 or tooth system engage in corresponding recesses on the actuating unit 5 so that a movement of the actuating rod 10 along the actuating axis B can be transmitted to the actuating unit 5.

The pivoting movement of the actuating member 6 or the actuating rod 10 is explained by means of the FIG. 5. The actuating rod 10 is fed through the locking element 23 through an opening 26. The opening 26 comprises here two recesses 27 that are arranged opposite to one another. Said recesses 27 serve for receiving the latching means 33 on the actuating rod 10 and in this manner, a rotationally fixed connection between the actuating rod 10 and the locking element 23 is provided via the combination of latching means 33 and recess 27, as a result of which the rotational movement of the locking element 23 is transmitted to the actuating rod 10.

Furthermore, with reference to the FIGS. 4 and 5 it is clearly visible that the actuating element 7 can be laterally displaced relative to the actuating axis B, thus in a plane perpendicular to the actuating axis B. For this purpose, the actuating element 7 is connected with guides 37 on the mounting element. The guides 37 enable displacing the actuating element 7. The guides 37 can be part of an adjusting element 38 that can be pivoted about the actuating axis B and relative to the mounting element 8. Accordingly, the actuating element 7 can be moved relative to the mounting element 8 so that the manufacturing tolerances of the flushing tank can be compensated.

The receptacle 9 for mounting the actuating rod 10 on the mounting element 8 can be part of the actuating element 7 and/or can be formed directly on the mounting element 8.

Furthermore, lateral to the drain fitting, a level drain 34 is arranged through which water can be discharged from the flushing tank in the event of a defective filling valve. The level drain 34 ends in the outlet between the valve seat 14 and the outlet opening 29 and can be changed in terms of its height.

REFERENCE LIST

1 Drain fitting
2 Drain fitting housing
3 Interior
4 Valve body
5 Actuating unit
6 Actuating member
7 Actuating element
8 Mounting element
9 Receptacle
10 Actuating rod
11 Connecting nozzle
12 Thread
13 Flange
14 Valve seat
15 Surface shell
16 Actuating button
17 Actuating button
18 Yoke section
19 Mounting rods
20 Guides
21 Upper surface
22 T-groove
23 Locking element
24 Latching means, tooth system
25 Latching means
26 Opening
27 Recesses
29 Outlet openings
30 Lugs
31 Guides
32 Surface
33 Latching means
34 Level drain
35 Plate
36 Opening
37 Guide element
38 Adjusting element

The invention claimed is:

1. A height-adjustable drain fitting for a flushing tank, comprising:
    a drain valve housing having an interior,
    a valve body that is mounted in the interior and can be lifted along an actuating axis so as to initiate flushing,
    an actuating unit that acts on the valve body and controls movement of the valve body, wherein the actuating unit is arranged in the interior,
    an actuating member which acts on the actuating unit so as to initiate flushing,
    an actuating element that acts on the actuating member and by means of which the actuating member can be actuated by a user, and
    a mounting element having a receptacle for mounting the actuating member, wherein the mounting element is displaceable relative to the drain valve housing and is connected thereto for adjusting a height of the mounting element, and the receptacle is spaced apart from the drain valve housing,
    wherein, the actuating member has a shape of a rod which extends out of the interior of the drain valve housing in a direction of the actuating axis and is configured to be height-adjustable relative to the drain valve housing,
    wherein the drain fitting comprises a locking element that is mounted on the drain valve housing and by which the mounting element can be locked on the drain valve housing,
    wherein the actuating member comprises member latching elements, which extend along the actuating member and engage on the actuating unit so that a movement of the actuating member can be transmitted to the actuating unit, and wherein the actuating member is fed through said locking element through an opening in said locking element, wherein the opening has at least one recess for the member latching elements of the actuating member, wherein a rotationally fixed connection between the locking element and the actuating member can be provided by said member latching elements protruding into said recess.

2. The drain fitting according to claim 1, wherein the actuating member is collinear to the actuating axis.

3. The drain fitting according to claim 1, wherein locking between the mounting element and the drain valve housing is carried out via housing latching elements.

4. The drain fitting according to claim 3, wherein the actuating member is fed through the locking element, wherein the actuating member is configured to be movable relative to the locking element in the direction of the actuating axis, and wherein the actuating member is configured to be rotationally fixed with respect to the locking element.

5. The drain fitting according to claim 3, wherein the locking element is moveable into a locking position that fixes the mounting element with respect to the drain valve housing and into a release position in which the mounting element is moveable with respect to the drain valve housing, wherein in the release position, a height between the drain valve housing and the mounting element is adjustable.

6. The drain valve fitting according to claim 5, wherein in said locking position, the actuating member is in engagement with the actuating unit, and in said release position, an engagement between the actuating member and the actuating unit is released so that a height of the actuating member and the height of the mounting element with respect to the drain valve housing is adjustable, wherein the actuating member is pivotable about the actuating axis and engageable with the actuating unit via the pivoting movement.

7. The drain fitting according to claim 1, wherein the mounting element comprises first latching elements and the locking element comprises second latching elements, wherein the mounting element is at least one of lockable and latchable with respect to the locking element via the first and second latching elements.

8. The drain fitting according to claim 7, wherein the first and second latching elements comprise a tooth system.

9. The drain fitting according to claim 1, wherein the member latching elements comprise a tooth system.

10. The drain fitting according to claim 1, wherein the actuating unit comprises a plate with an opening for receiving the actuating member, wherein in a locked state, the plate is positioned between two adjacent member latching elements of the actuating member such that the movement can be transmitted from the actuating member to the plate.

11. The drain fitting according to claim 1, wherein the locking element has the shape of a disc and the locking element is configured to be pivotable about the actuating axis.

12. The drain fitting according to claim 1, wherein the actuating element is movably mounted on the mounting element in a plane perpendicular to the actuating axis, wherein tolerances can be compensated in this manner, and wherein the actuating element has two buttons for initiating a dual flush, wherein the dual flush is controlled via a different stroke of the buttons and activation of the actuating unit.

13. The drain fitting according to claim 1, wherein the mounting element, when viewed in the direction of the actuating axis, has a cross-section with regard to its outer dimension, wherein the cross-section is substantially the same as or smaller than the outer dimension of the drain valve housing when viewed in the direction of the actuating axis.

14. The drain fitting according to claim 1, wherein the mounting element comprises a yoke section in which the receptacle is arranged, and comprises at least two mounting rods extending from the yoke section, wherein the mounting rods are mounted in guides on the drain valve housing.

15. The drain fitting according to claim 14, wherein each guide on the drain valve housing has the shape of a T-groove, and each mounting rod is formed complementary to said T-groove.

16. The drain fitting according to claim 1, wherein the locking element has the shape of a disc.

17. The drain fitting according to claim 1, wherein the locking element is configured to be pivotable about the actuating axis.

18. The drain fitting according to claim 1, wherein the actuating element is movably mounted on the mounting element in a plane perpendicular to the actuating axis, whereby tolerances can be compensated.

19. The drain fitting according to claim 1, wherein the actuating element has two buttons for initiating a dual flush, wherein the dual flush is controlled via a different stroke of the buttons and activation of the actuating unit.

20. A height-adjustable drain fitting for a flushing tank, comprising:

a drain valve housing having an interior, a valve body that is mounted in the interior and can be lifted along an actuating axis so as to initiate flushing, an actuating unit that acts on the valve body and controls movement of the valve body, wherein the actuating unit is arranged in the interior, an actuating member which acts on the actuating unit so as to initiate flushing, an actuating element that acts on the actuating member and by means of which the actuating member can be actuated by the user, and a mounting element having a receptacle for mounting the actuating member, wherein the mounting element is displaceable relative to the drain valve housing and is connected thereto for adjusting a height of the mounting element, and the receptacle is spaced apart from the drain valve housing, wherein, the actuating member has a shape of a rod which extends out of the interior of the drain valve housing in a direction of the actuating axis and is configured to be height-adjustable relative to the drain valve housing, wherein the drain fitting comprises a locking element that is mounted on the drain valve housing and by which the mounting element can be locked on the drain valve housing, wherein the locking element is moveable into a locking position that fixes the mounting element with respect to the drain valve housing and into a release position in which the mounting element is moveable with respect to the drain valve housing, wherein in the release position, a height between the drain valve housing and the mounting element is adjustable, and wherein the actuating member is fed through the locking element, wherein the actuating member is configured to be movable relative to the locking element in the direction of the actuating axis, and wherein a rotationally fixed connection between the locking member and the actuating member is provided,
wherein the locking element is configured to be pivotable about the actuating axis.

21. The drain fitting according to claim 20, wherein the actuating member is collinear to the actuating axis.

22. The drain fitting according to claim 20, wherein locking between the mounting element and the drain valve housing is carried out via housing latching elements.

23. The drain valve fitting according to claim 22, wherein in said locking position, the actuating member is in engagement with the actuating unit, and in said release position, an engagement between the actuating member and the actuating unit is released so that a height of the actuating member and the height of the mounting element with respect to the drain valve housing is adjustable, wherein the actuating member is pivotable about the actuating axis and engageable with the actuating unit via the pivoting movement.

24. The drain fitting according to claim 20, wherein the mounting element comprises first latching elements and the locking element comprises second latching elements, wherein the mounting element is at least one of lockable and latchable with respect to the locking element via the first and second latching elements.

25. The drain fitting according to claim 24, wherein the first and second latching elements comprise a tooth system.

26. The drain fitting according to claim 20, wherein the actuating member comprises an actuating rod with member latching elements, wherein the member latching elements extend along the actuating rod and engage on the actuating unit so that a movement of the actuating rod can be transmitted to the actuating unit.

27. The drain fitting according to claim 26, wherein the latching elements comprise a tooth system.

28. The drain fitting according to claim 26, wherein the actuating unit comprises a plate with an opening for receiving the actuating member, wherein in a locked state, the plate is positioned between two adjacent latching elements of the actuating member such that a movement can be transmitted from the actuating rod to the plate.

29. The drain fitting according to claim 20, wherein the actuating member comprises member latching elements, which extend along the actuating member and engage on the actuating unit so that a movement of the actuating member can be transmitted to the actuating unit, wherein the actuating member is fed through the locking element through an opening in the locking element, wherein the opening has at least one recess for the latching elements, and wherein the rotationally fixed connection between the locking element and the actuating member is provided by the latching elements protruding into said recess.

30. The drain fitting according to claim 20, wherein the actuating element is movably mounted on the mounting element in a plane perpendicular to the actuating axis, whereby tolerances can be compensated, and wherein the actuating element has two buttons for initiating a dual flush.

31. The drain fitting according to claim 30, wherein the dual flush is controlled via a different stroke of the buttons and activation of the actuating unit.

32. The drain fitting according to claim 20, wherein the mounting element, when viewed in the direction of the actuating axis, has a cross-section with regard to its outer dimension, wherein the cross-section is substantially the same as or smaller than the outer dimension of the drain valve housing when viewed in the direction of the actuating axis.

33. The drain fitting according to claim 20, wherein the mounting element comprises a yoke section in which the receptacle is arranged, and comprises at least two mounting rods extending from the yoke section, wherein the mounting rods are mounted in guides on the drain valve housing.

34. The drain fitting according to claim 33, wherein each guide on the drain valve housing has the shape of a T-groove, and each mounting rod is formed complementary to said T-groove.

35. The drain fitting according to claim 20, wherein the locking element has the shape of a disc.

36. The drain fitting according to claim 20, wherein the actuating element is movably mounted on the mounting element in a plane perpendicular to the actuating axis, whereby tolerances can be compensated.

37. The drain fitting according to claim 20, wherein the actuating element has two buttons for initiating a dual flush, wherein the dual flush is controlled via a different stroke of the buttons and activation of the actuating unit.

* * * * *